(12) United States Patent
Inoue

(10) Patent No.: US 8,572,693 B2
(45) Date of Patent: *Oct. 29, 2013

(54) RECEPTION APPARATUS

(75) Inventor: Hitoshi Inoue, Yokohama (JP)

(73) Assignee: Kyocera Corporation, Kyoto (JP)

( * ) Notice: Subject to any disclaimer, the term of this patent is extended or adjusted under 35 U.S.C. 154(b) by 282 days.

This patent is subject to a terminal disclaimer.

(21) Appl. No.: 12/670,085

(22) PCT Filed: Jul. 24, 2008

(86) PCT No.: PCT/JP2008/063314
§ 371 (c)(1),
(2), (4) Date: May 5, 2010

(87) PCT Pub. No.: WO2009/014187
PCT Pub. Date: Jan. 29, 2009

(65) Prior Publication Data
US 2010/0257590 A1 Oct. 7, 2010

(30) Foreign Application Priority Data
Jul. 25, 2007 (JP) ................................. 2007-193729

(51) Int. Cl.
*G06F 21/00* (2013.01)
(52) U.S. Cl.
USPC ................... 726/3; 725/25; 726/22; 713/191; 380/210; 380/278; 380/286
(58) Field of Classification Search
USPC ......... 380/210, 278, 286; 713/191; 726/3, 22; 725/25
See application file for complete search history.

(56) References Cited

U.S. PATENT DOCUMENTS 7,640,597 B1 * 12/2009 Koguchi et al. ................. 726/34
7,764,791 B2 * 7/2010 LeComte ...................... 380/210
7,975,287 B2 * 7/2011 Hung ................................. 726/2
(Continued)

FOREIGN PATENT DOCUMENTS

JP 2003-324712 11/2003
JP 2005-167987 6/2005
(Continued)

OTHER PUBLICATIONS

International Search Report for PCT/JP2008/063314, mailed on Sep. 16, 2008, 2 pages.
Office Action for Japanese Patent Application No. 193,729/2007, mailed May 8, 2012, 5 pages (including English translation).

*Primary Examiner* — Carl Colin
*Assistant Examiner* — Mohammad A Siddiqi
(74) *Attorney, Agent, or Firm* — Duane Morris LLP

(57) ABSTRACT

A reception apparatus of the present invention is provided with a reception unit 301 for receiving a stream including a data signal, a display unit 305 for displaying based on the stream received by the reception unit 301, an authentication process unit 302 for authenticating a sender of the stream received by the reception unit 301, a signal separating unit 303 for separating the data signal from the stream received by the reception unit 301, and a control unit 310 for controlling so as to prohibit the screen unit 305 from displaying a screen based on the data signal separated by the signal separating unit 303 during authentication of the stream by the authentication process unit 302. Thereby, the reception apparatus appropriately plays contents without inflicting a disadvantage or stress on a user.

9 Claims, 14 Drawing Sheets

(56) References Cited

U.S. PATENT DOCUMENTS

| | | |
|---|---|---|
| 8,261,348 B2 * | 9/2012 | Goto .............................. 726/22 |
| 2002/0138749 A1 * | 9/2002 | Koguchi et al. ............... 713/191 |
| 2004/0254887 A1 * | 12/2004 | Jacoby ........................... 705/52 |
| 2007/0065093 A1 * | 3/2007 | Takatori et al. ................. 386/46 |
| 2008/0272188 A1 * | 11/2008 | Keithley et al. ............... 235/379 |
| 2009/0323948 A1 * | 12/2009 | Fukushima et al. .......... 380/210 |
| 2010/0229215 A1 * | 9/2010 | Goto ............................... 726/3 |

FOREIGN PATENT DOCUMENTS

| | | |
|---|---|---|
| JP | 2006-128971 | 5/2006 |
| JP | 2006-254234 | 9/2006 |
| JP | 2006-345378 | 12/2006 |

* cited by examiner

FIG. 5
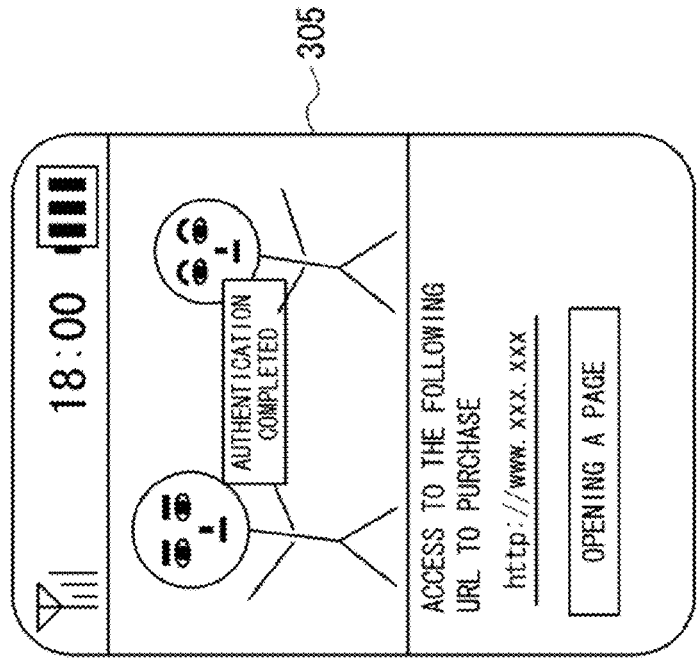
(b)
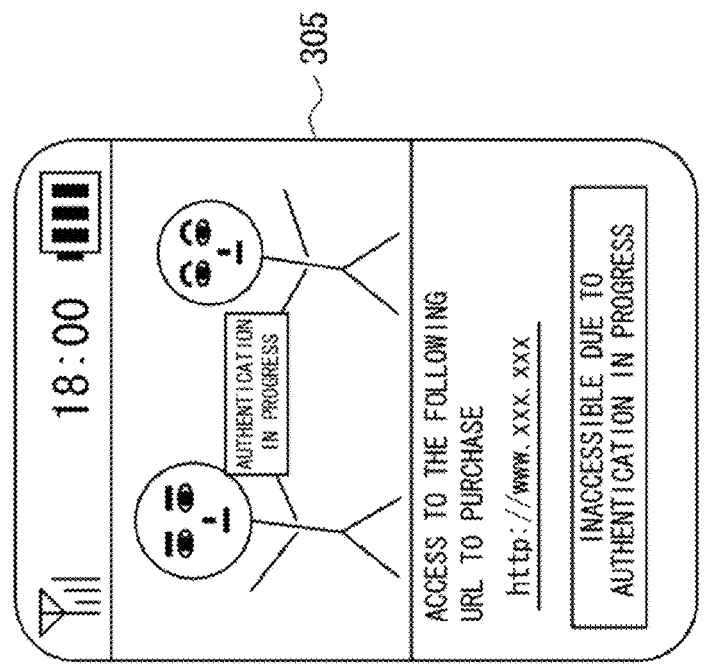
(a)

FIG. 7
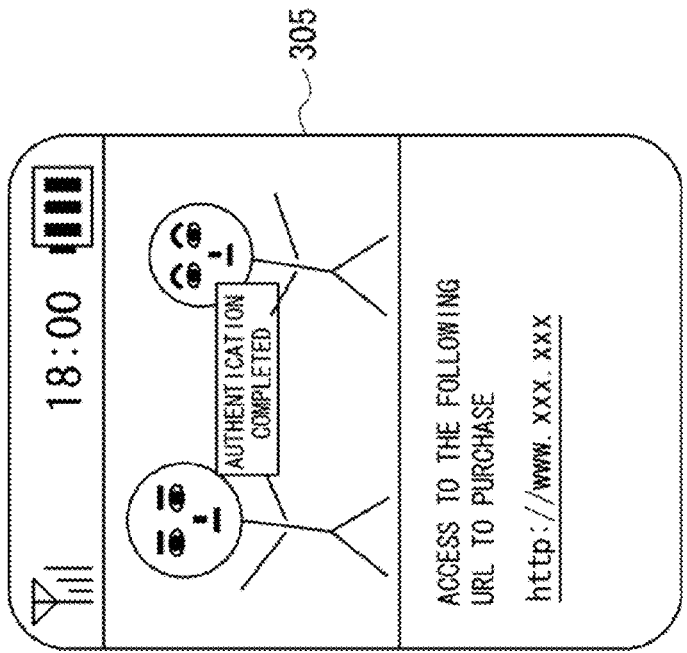
(a)
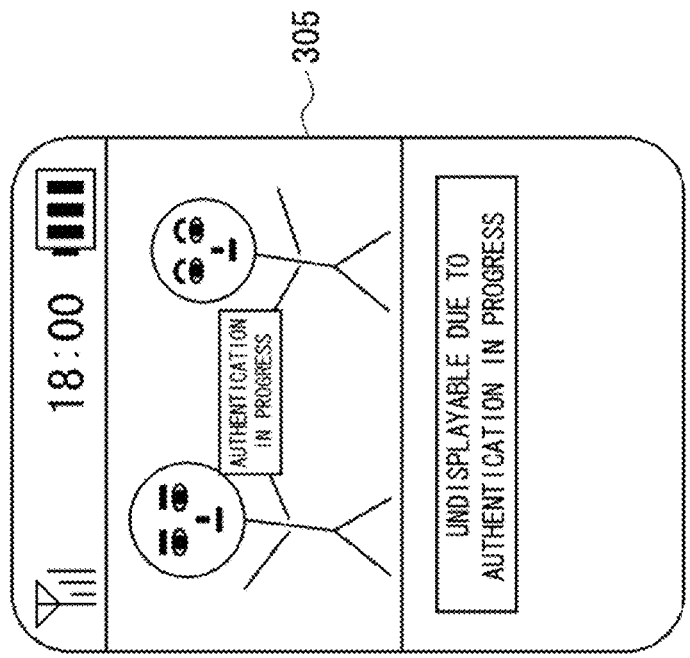
(b)

RECEPTION APPARATUS

CROSS REFERENCE TO RELATED APPLICATIONS

This application is a U.S. National Phase Application of International Application No. PCT/JP2008/063314 filed on Jul. 24, 2008, which claims priority to and the benefit of Japanese Patent Application No. 2007-193729 filed on Jul. 25, 2007, the entire contents of which are incorporated herein by reference.

TECHNICAL FIELD

The present invention relates to a reception apparatus capable of receiving contents to which a data signal including a link to an external site is added.

BACKGROUND ART

A recent television broadcasting system, for example, can broadcast a number of program contents to a viewer, as multi-channel broadcasting is developed along with a widespread use of digital broadcast. Also, the number of services that distribute video contents has been increasing along with a widespread use of the high-speed internet in the internet environment.

Adjunct data (for example, data broadcast in the digital broadcast) of data signals are sometimes added to a stream of contents distributed by such a digital broadcasting system or a contents distribution service of the internet or the like. The adjunct data may include link information such as an URL (Uniform Resource Locator: Internet Address).

In the contents distribution service, it is necessary to protect a copyright of contents to be distributed by preventing an unauthorized use of the contents by a malicious user. As one of known arts, for example, there is a metadata utilization control system capable of protecting a right of a broadcast station by utilizing contents only with metadata signed by a metadata provider granted by the broadcast station (see Patent Document 1, for example).

With regard to the contents distribution service, it is also necessary to ensure a security of the contents to a viewer. This is because not only a stream of legitimate contents, a contents reception apparatus may also receive, for example, a stream which is after a while switched to an unintended fraudulent stream containing a packet whose relationship with its previous or following packet is not guaranteed.

As for the digital broadcast, the reception apparatus may receive a fraudulent stream to which so-called "spoofing" is performed, with a falsified data broadcast in which interactive communication is possible, and image data and audio data both of which are remain intact. In such a case, there is a concern that a user accesses to the URL included in the data broadcast with believing that information should be safe as it is distributed by a trustworthy broadcast station, which may result in damaging the user seriously by phishing and the likes.

Hence, in the contents distribution service, it is necessary to ensure the security of the contents and, as one method for that purpose, a stream authentication is a known scheme to ensure legitimacy of the stream by adding a signature to authenticate sender identification to the contents.

As stated above, if a transmission apparatus transmits a stream with contents whose security is ensured by the stream authentication, the reception apparatus may refrain from playing the stream received until it is ensured to be legitimate (that is, during a process of authentication), which may prevent inflicting a disadvantage on the user.

Patent Document 1: Japanese Patent Application Laid-Open No. 2006-254234

SUMMARY OF INVENTION

Technical Problem

However, the stream authentication stated above ensures the relationship of a packet with its previous or following packet constituting the stream of the contents. Thus, in order for the reception apparatus to ensure that the stream is legitimate (the stream is constituted of a series of packets with relationship therebetween being ensured), it is necessary to receive a certain number of packets to verify them, which takes a certain amount of time.

Consequently, with the reception device which refrains from playing the stream received during the process of the authentication as stated above, the user, even if selecting a desired contents, cannot view the contents, which is stressful for the user.

Therefore, it is an object of the present invention in consideration of such a circumstance to provide a reception apparatus capable of playing the contents appropriately without inflicting the disadvantage or stress on the user.

Solution to Problem

In order to achieve the above object, the present invention according to a first aspect is characterized in that a reception apparatus includes:

a reception unit for receiving a stream including a data signal;

a display unit for performing display based on the stream received by the reception unit;

an authentication process unit for authenticating a sender of the stream received by the reception unit;

a signal separating unit for separating the data signal from the stream received by the reception unit; and a control unit for controlling so as to prohibit the display unit from displaying a screen based on the data signal separated by the signal separating unit during authentication of the stream by the authentication process unit.

The present invention according to a second aspect is characterized in that the reception apparatus of the first aspect further includes a first switch key for switching a screen composition of the display unit to a screen composition including the screen based on the data signal, wherein the control unit invalidates switching of the screen composition of the display unit by the first switch key during the authentication of the stream by the authentication process unit.

The present invention according to a third aspect is characterized in that the reception apparatus of the first aspect further includes a second switch key for instructing switching of a screen composition of the display unit, wherein the control unit skips the screen composition including the screen based on the data signal when the screen composition of the display unit is switched by the second switch key during the authentication of the stream by the authentication process unit.

Moreover, the present invention according to a fourth aspect is characterized in that a reception apparatus includes:

a reception unit for receiving a stream including a data signal;

a display unit for performing display based on the stream received by the reception unit;

an authentication process unit for authenticating a sender of the stream received by the reception unit;

a signal separating unit for separating the data signal from the stream received by the reception unit; and a control unit for controlling so as to restrict linking to an external site based on the data signal separated by the signal separating unit during authentication of the stream by the authentication process unit.

The present invention according to a fifth aspect is characterized in the reception apparatus of the fourth aspect, wherein the control unit prohibits the display unit from displaying the link to the external site based on the data signal during the authentication of the stream by the authentication process unit.

The present invention according to a sixth aspect is characterized in the reception apparatus of the fourth aspect, wherein the control unit invalidates an access request to the link to the external site based on the data signal displayed on the display unit during the authentication of the stream by the authentication process unit.

The present invention according to a seventh aspect is characterized in that the reception apparatus of the fourth aspect further includes a memory unit for storing the access request to the link to the external site based on the data signal displayed on the display unit, wherein the control unit stores the access request to the link to the external site based on the data signal displayed on the display unit during the authentication of the stream by the authentication process unit and, when the authentication of the stream by the authentication process unit is succeeded, executes the access request stored in the memory unit.

Advantageous Effects on Invention

The reception apparatus in accordance with the present invention prohibits the display unit from displaying a screen or a link to an external site that are based on the data signal, without limiting an output based on video data and audio data during authentication of the stream. Thereby, the reception apparatus in accordance with the present invention is capable of playing the contents without inflicting stress on a user due to a limitation in viewing the stream while preventing the disadvantage for the user caused by connecting to a malicious site based on the data signal.

BRIEF DESCRIPTION OF DRAWINGS

FIG. 5 is a diagram showing an example of a screen display of the reception apparatus in accordance with the first embodiment;

FIG. 7 is a diagram showing an example of a screen display of the reception apparatus in accordance with the second embodiment;

REFERENCE SIGNS LIST

Figure 1:
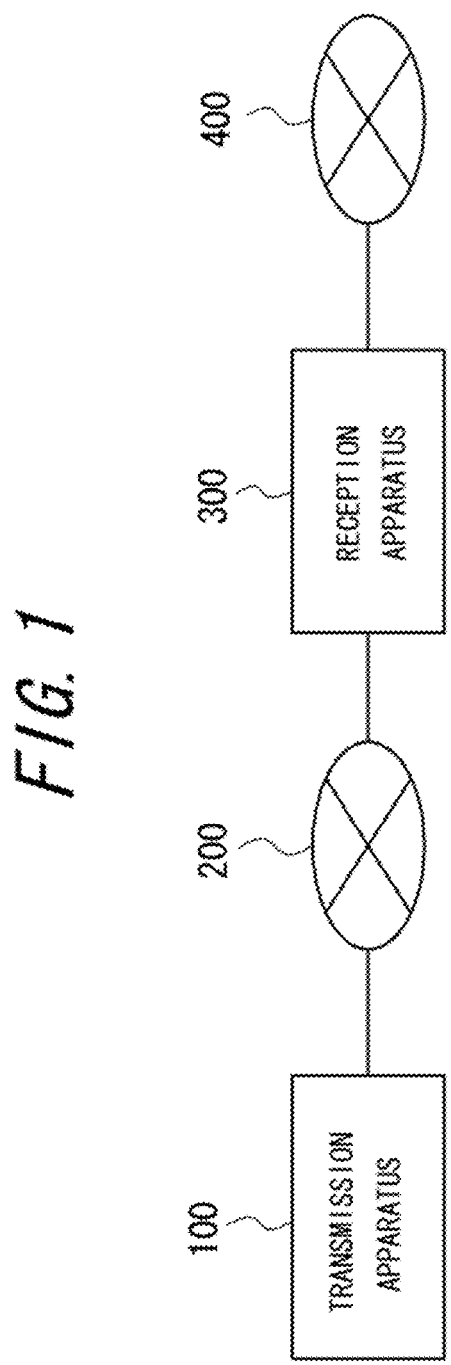
FIG. 1 is a schematic view showing an example of a contents distribution service system using a reception apparatus in accordance with a first embodiment of the present invention.

100 transmission apparatus
101 contents memory unit
102 adjunct data memory unit
103 data combining unit
104 signature unit
105 transmission unit
106 control unit
200, 400 network
300 reception apparatus
301 broadcast reception unit
302 authentication process unit
303 signal separating unit
304 contents reproduction unit
305 display unit
306 speaker
307 input unit
307*a* first switch key
307*b* second switch key
308 memory
309 communication unit
310 control unit

DESCRIPTION OF EMBODIMENTS

Embodiments of the present invention will be described with reference to the accompanying drawings.

First Embodiment

FIG. 1 is a schematic view illustrating an example of a contents distribution service system using a reception apparatus in accordance with a first embodiment of the present invention. The contents distribution service system shown in FIG. 1 is provided with a transmission apparatus 100 for transmitting contents, a network 200 for distributing the contents from the transmission apparatus 100, a reception apparatus 300 for receiving the contents distributed via the network 200, and a network 400 for the reception apparatus 300 to perform a web access and the likes by use of adjunct data added to the contents received. It is to be noted that the network 200 and the network 400 can be the same network.

Figure 2:
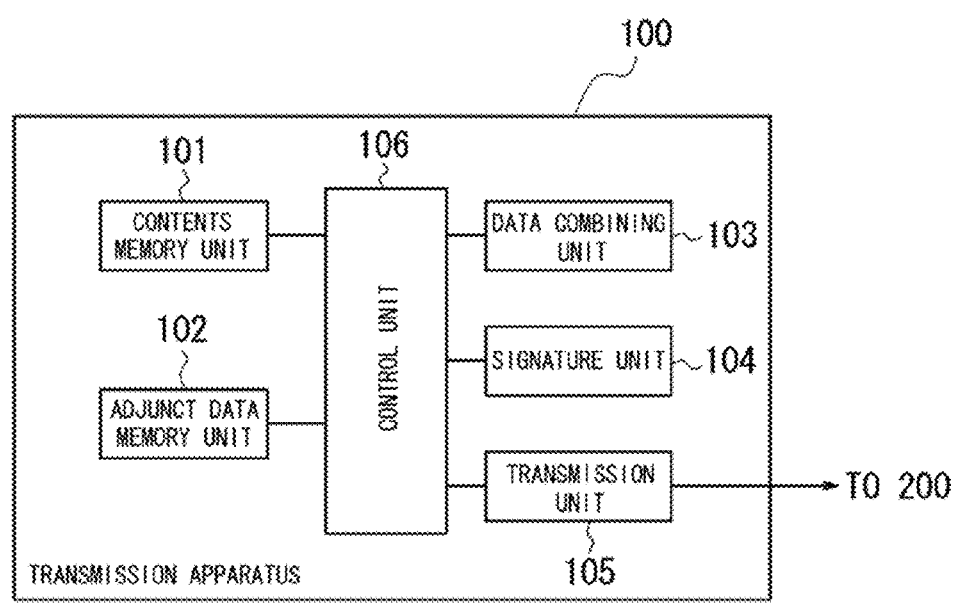
FIG. 2 is a functional block diagram showing a constitution of a main section of a transmission apparatus shown in FIG. 1.

FIG. 2 is a functional block diagram illustrating a constitution of a main section of the transmission apparatus 100 shown in FIG. 1. The transmission apparatus 100 is provided with a contents memory unit 101, an adjunct data memory unit 102, a data combining unit 103, a signature unit 104, a transmission unit 105, and a control unit 106 for controlling entire operations.

The control unit 106 reads out necessary contents to transmit from a plurality of contents stored in the contents memory unit 101 and, when there is adjunct data to add to the contents read out, reads out corresponding adjunct data from a plurality of adjunct data stored in the adjunct data memory unit 102. The control unit 106 controls the data combining unit 103 to combine the contents with the adjunct data read out. Furthermore, the control unit 106 controls the signature unit 104 to add a signature of a sender of the contents to a combination of the contents and the adjunct data such that a stream thereof can be authenticated, and the transmission unit 105 to distribute the stream to the network 200. Here, for the sake of simplicity of explanation, it is assumed that the transmission apparatus 100 wirelessly transmits a stream of a digital broadcast, in which a data signal expressed in BML (Broadcast Markup Language) to which link information to an external site such as a URL is selectively added is combined as adjunct data with contents having an image signal and an audio signal, to the reception apparatus 300 via the network 200 of a broadcast network.

Figure 3:
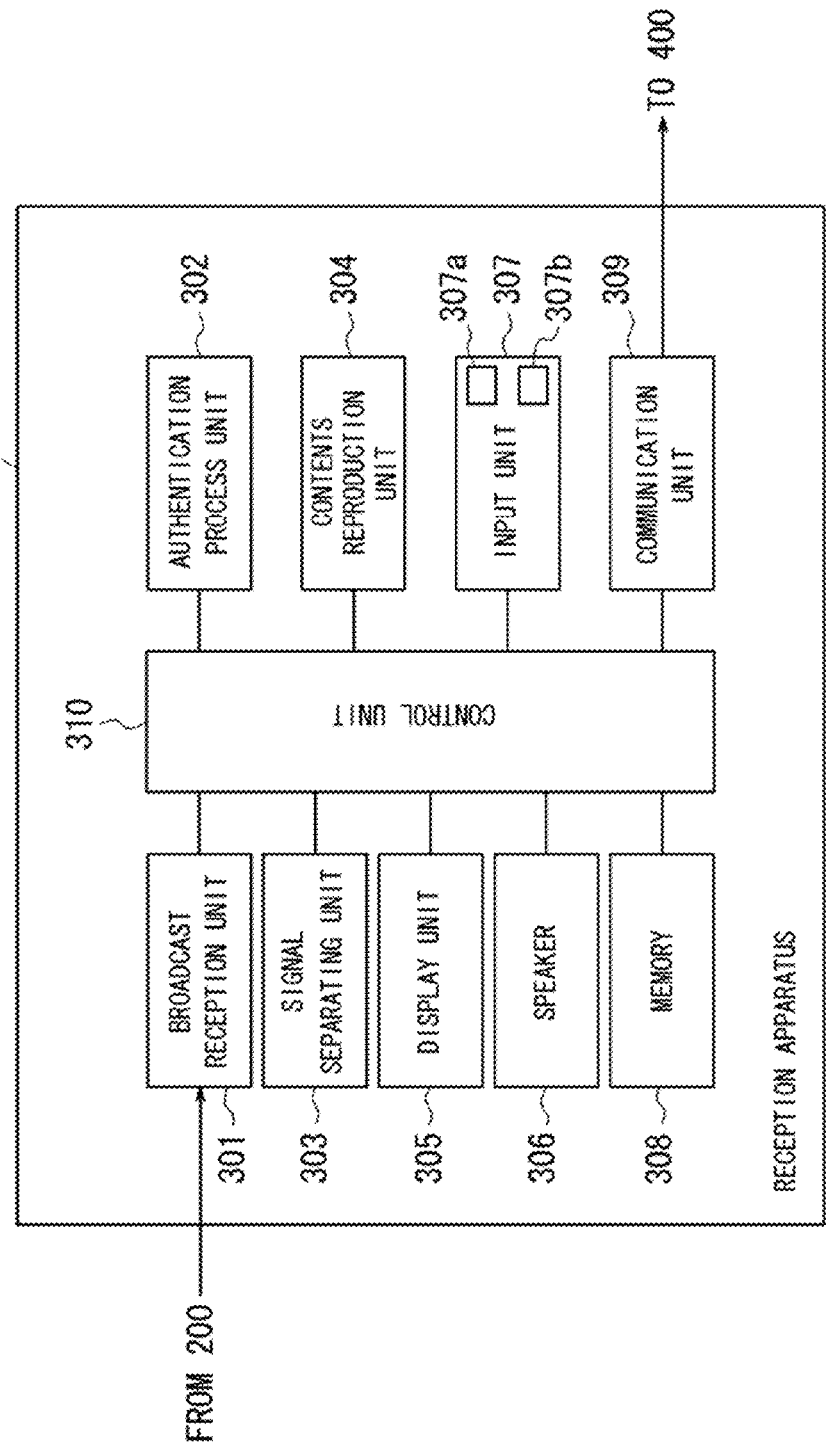
FIG. 3 is a functional block diagram showing a constitution of a main section of the reception apparatus shown in FIG. 1.

FIG. 3 is a functional block diagram illustrating a constitution of a main section of the reception apparatus 300 in accordance with the present embodiment shown in FIG. 1. The reception apparatus 300 is, for example, a cellular phone terminal capable of receiving the digital broadcast and provided with a broadcast reception unit 301, an authentication process unit 302, a signal separating unit 303, a contents reproduction unit 304, a display unit 305, a speaker 306, an input unit 307, a memory 308, a communication unit 309, and a control unit 310 for controlling entire operations.

The input unit 307 is provided with a variety of operation keys such as a numerical keypad and directional keys constituted of mechanical keys or touch panel keys. The input unit 307 has two predetermined operation keys: one assigned as a first switch key 307a for switching a screen composition of the display unit 305 to a screen composition including a screen based on the data signal of the digital broadcast or a screen composition not including the screen based on the data signal, and the other assigned as a second switch key 307b for switching the screen composition of the display unit 305 to a screen composition by a combination of a large image display area or a small image display area with or without the data signal.

The control unit 310 controls such that the broadcast reception unit 301 receives contents of a desired broadcast channel among the contents distributed to the network 200 and the authentication process unit 302 decrypts and authenticates a stream of the contents received. Also, the control unit 310 controls such that the signal separating unit 303 separates the stream decrypted by the authentication process unit 302 into the image signal, the audio signal and the data signal and then the contents reproduction unit 304 decodes and reproduces each of the signals.

The control unit 310 of the reception apparatus 300 in accordance with the present embodiment controls such that the image and data reproduced by the contents reproduction unit 304 are displayed on the display unit 205 and the audio is output from the speaker 306 when the authentication is succeeded by the authentication process unit 302. Thereby, a user can view the desired broadcast channel received by the broadcast reception unit 301. In addition, the control unit 310 allows an access request to a URL displayed on the display unit 305 based on an operation of the input unit 307 by the user, and starts the web access from the communication unit 309 via the network 400 of a mobile communication network.

In addition, during the authentication by the authentication process unit 302, the control unit 310 controls such that the image and the data reproduced by the contents reproduction unit 304 are displayed on the display unit 305 and the audio is output from the speaker 306. However, the control unit 310 invalidates the access request to the URL of the data displayed on the display unit 305 and displays accordingly on the display unit 305, while storing the access request in the memory 308. At a point where the authentication is succeeded later, the control unit 310 reads the access request out from the memory 308 and starts the web access from the communication unit 309 via the network 400.

Figure 4:
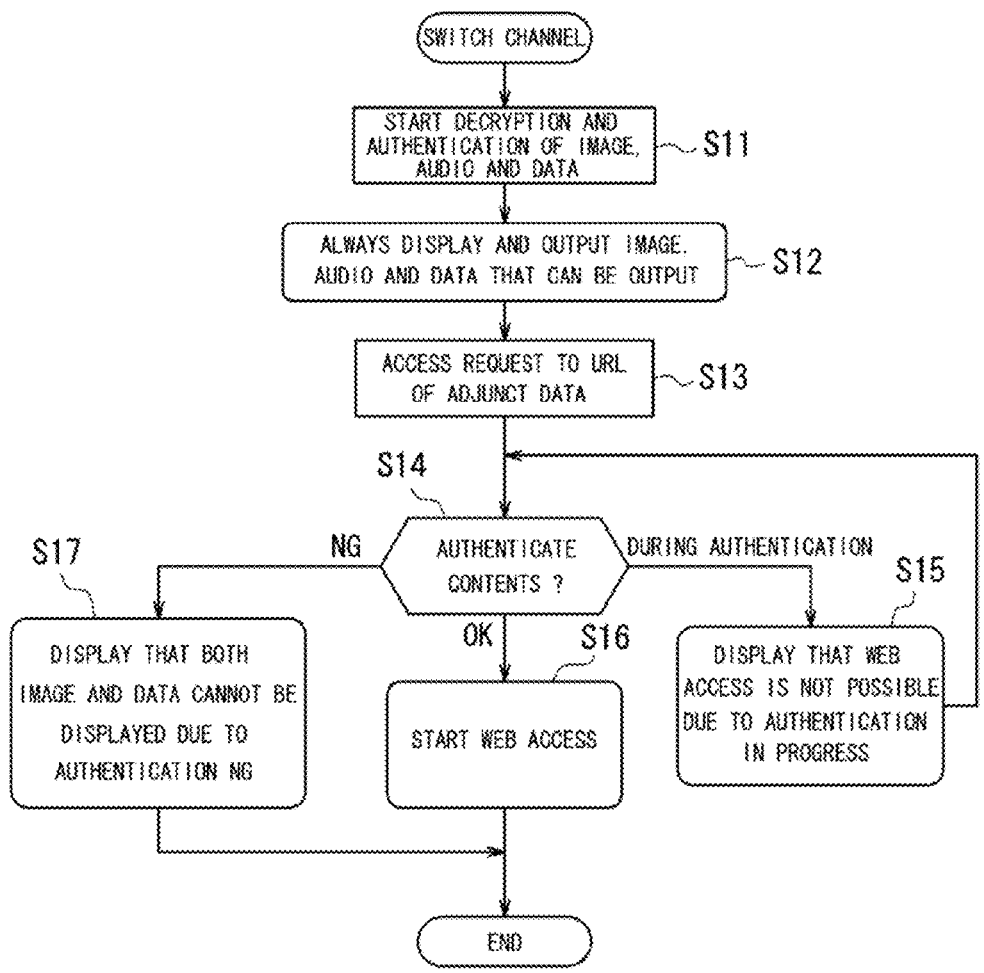
FIG. 4 is a flow chart illustrating an operation of the main section of the reception apparatus in accordance with the first embodiment.

The following is a description of an operation of a main unit of the reception apparatus 300 in accordance with the present embodiment, with reference to a flow chart shown in FIG. 4 and an example of a screen display shown in FIG. 5.

First, in response to the operation of the input unit 307 by the user to switch the broadcast channel (CH), the control unit 310 switches the broadcast channel received by the broadcast reception unit 301 to a desired broadcast channel. Then, the authentication process unit 302 decrypts the image signal, the audio signal and the data signal of the stream received on the broadcast channel and starts authentication of the contents (step S11).

In a case where there are an image signal, an audio signal and data signal that can be output as a result of the decryption at the step S11, the control unit 310 controls the contents reproduction unit 304 to reproduce the image signal, the audio signal and the data signal which are decrypted, and controls the image and data to be displayed on the display unit 305 and the audio to be output from the speaker 306 (step S12). Thus, even during the authentication of the contents, the user can immediately view the contents of the desired broadcast channel selected by the broadcast reception unit 301, which will inflict no stress on the user.

When the user operates the input unit 307 to establish the access request to the URL displayed on the display unit 305 during the authentication of the contents by the authentication process unit 302 (step S13), the control unit 310 invalidates and temporality stores the access request in the memory 308, and then determines a state of the authentication of the contents by the authentication process unit 302 (step S14). In a case where the authentication is still in progress as a result, the control unit 310 controls such that the display unit 305 displays a message informing that the web (Web) access is not possible due to the authentication in progress (step S15), as shown in FIG. 5(a).

FIG. 5(a) shows an example where the display unit 305 has a vertically long display area with an upper image display area on which a message "Authentication In Progress" is displayed overlapping an image, and a lower data display area on which a message "Inaccessible Due To Authentication In Progress" is displayed overlapping BML (data signal).

Subsequently, in a case where the authentication of the contents is succeeded (OK) by the authentication process unit 302 at the step S14, the control unit 310 reads out the access request stored in the memory 308 and controls the communication unit 309 to start the web access via the network 400 (step S16).

FIG. 5(b) shows an example of a display state of the display unit 305 in such a case, displaying a message "Authentication Completed" overlapping the image on the upper image display area and a message "Opening a Page", which indicates that the web access is proceeding, overlapping the BML on the lower data display area. Displaying the message "Authentication Completed" is ended after a predetermined period, while displaying the message "Opening a Page" is ended when a predetermined web page is opened.

On the contrary, in a case where the authentication of the contents is failed (NG) by the authentication process unit 302 at the step S14, the control unit 310 erases the access request stored in the memory 308, controls such that the display unit 305 displays a message indicating that both of the image and the data cannot be displayed due to the authentication NG and then ends displaying the image and the data and outputting the audio (step S17).

As described above, the reception apparatus 300 in accordance with the present embodiment always displays the image and the data and outputs the audio even during the authentication of the contents. Thus, the user can immediately view the contents of the desired broadcast channel selected, which inflicts no stress on the user. Moreover, since the access request to a URL is temporality stored in the memory 308 during the authentication and executed at the point where the authentication is succeeded, it will not subject the user to a disadvantage to access to a fraudulent linked page.

Second Embodiment

A reception apparatus in accordance with a second embodiment of the present invention is configured such that, in the reception apparatus 300 in accordance with the first embodiment, the control unit 310 controls the apparatus 300 to always display the image and output the audio that can be output and not to display the BML until the authentication is succeeded.

Figure 6:
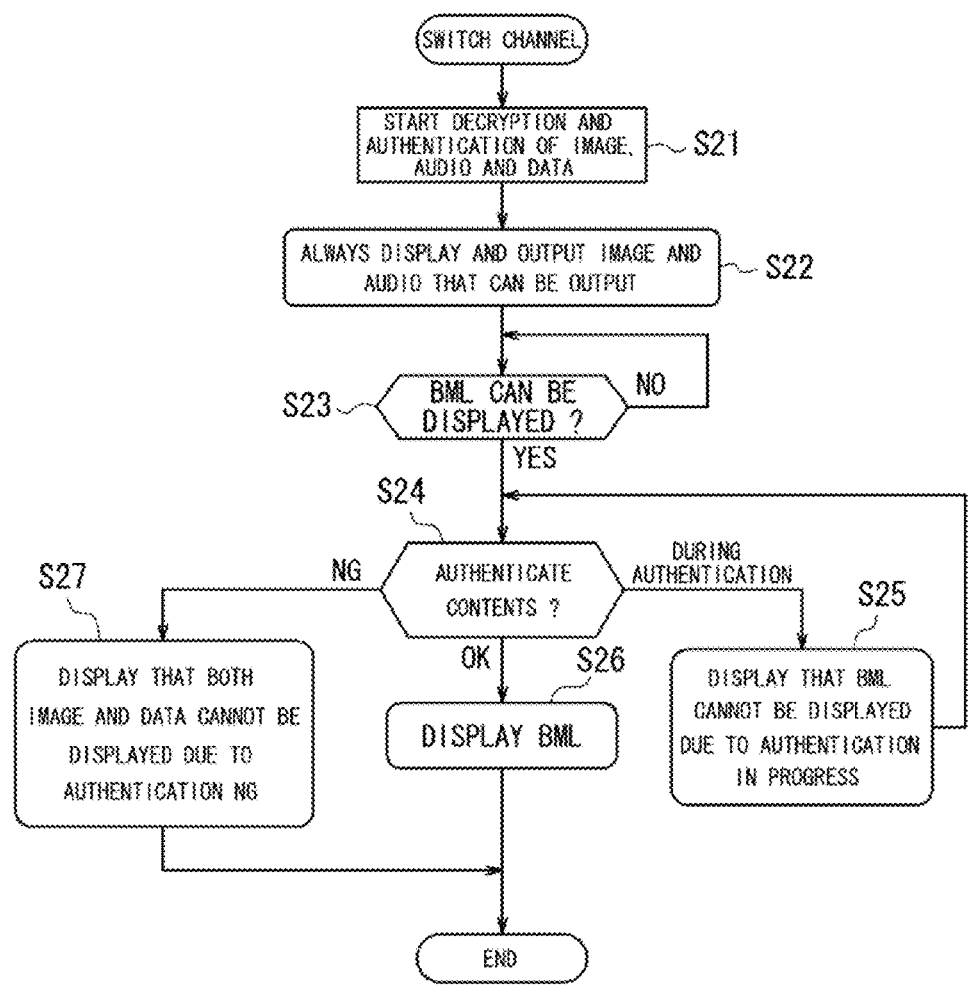
FIG. 6 is a flow chart illustrating an operation of a main section of a reception apparatus in accordance with a second embodiment of the present invention.

The following is a description of an operation of the main unit of the reception apparatus 300 in accordance with the present embodiment, with reference to a flow chart shown in FIG. 6 and an example of the screen display shown in FIG. 7.

First, in response to the operation of the input unit 307 by the user to switch the broadcast channel (CH), the control unit 310 switches the broadcast channel received by the broadcast reception unit 301 to the desired broadcast channel. Then, in a similar manner to the first embodiment, the authentication process unit 302 decrypts an image signal, an audio signal and a data signal of a stream received on the broadcast channel and starts authentication of the contents (step S21).

When there is an image signal and an audio signal that can be output as a result of the decryption at the step S21, the control unit 310 controls such that the contents reproduction unit 304 reproduces the image signal, the audio signal and the data signal which are decrypted so as to display the image on the display unit 305 while outputting the audio from the speaker 306 (step S22). Thus, even during the authentication of the contents, the user can immediately view the contents of the desired broadcast channel selected by the broadcast reception unit 301, which will inflict no stress on the user.

When there is the BML which can be displayed as a result of the decryption at the step S21 (step S23), the control unit 310 of the reception apparatus 300 in accordance with the present embodiment determines a state of the authentication of the contents by the authentication process unit 302 (step S24). In a case where the authentication is still in progress as a result, the control unit 310 controls such that the display unit 305 displays a message informing that the BML cannot be displayed due to the authentication in progress (step S25), as shown in FIG. 7(a).

FIG. 7(a) shows an example where the display unit 305 has a vertically long display area with the upper image display area on which the message "Authentication In Progress" is displayed overlapping an image in a similar manner as FIG. 5(a), and the lower data display area on which a message "Undisplayable Due To Authentication In Progress" is displayed without the BML.

Subsequently, in a case where the authentication of the contents is succeeded (OK) by the authentication process unit 302 at the step S24, the control unit 310 controls such that the message "Authentication Completed" is displayed overlapping the image on the image display area of the upper part of the display unit 305 and the BML is displayed on the lower data display area (step S26), as shown in FIG. 7(b). Thereby, the user can access to the URL displayed on the display unit 305 using the input unit 307. Displaying the message "Authentication Completed" is ended after a predetermined period.

On the contrary, in a case where the authentication of the contents is failed (NG) by the authentication process unit 302 at the step S24, the control unit 310, in a similar manner as the first embodiment, controls such that the display unit 305 displays a message indicating that both of the image and the data cannot be displayed due to the authentication NG and then ends displaying the image and the data and outputting the audio (step S27).

As described above, the reception apparatus 300 in accordance with the present embodiment always displays the image and outputs the audio even during the authentication of the contents, while displaying the BML only after a success of the authentication. Thus, in a similar manner as the first embodiment, the user can immediately view the contents of the desired broadcast channel selected, which inflicts no stress on the user. Moreover, since the BML is not displayed during the authentication and displayed at the point where the authentication is succeeded, it will not subject the user to a disadvantage by a fraudulent BML.

Third Embodiment

A reception apparatus in accordance with a third embodiment of the present invention is configured such that, in the reception apparatus 300 in accordance with the first embodiment, the control unit 310 controls the display unit 305 to switch a default screen composition not including the BML (BML non-display mode) to a screen composition including the BML (BML display mode) in response to an operation of the first switch key 307a assigned to the input unit 307 and, when the first switch key 307a is operated during the authentication of the contents, the screen composition to be switched to the BML display mode after the authentication is succeeded.

Figure 8:
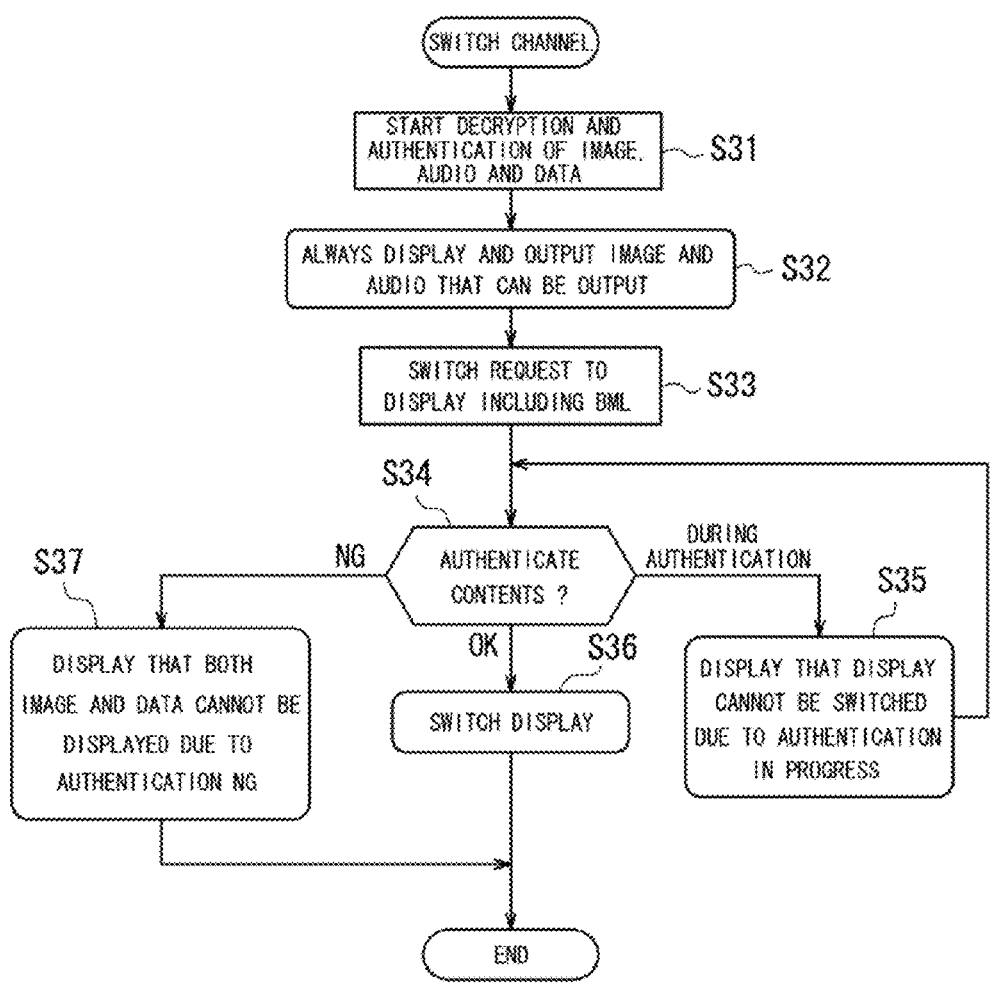
FIG. 8 is a flow chart illustrating an operation of a main section of a reception apparatus in accordance with a third embodiment of the present invention.
Figure 9:
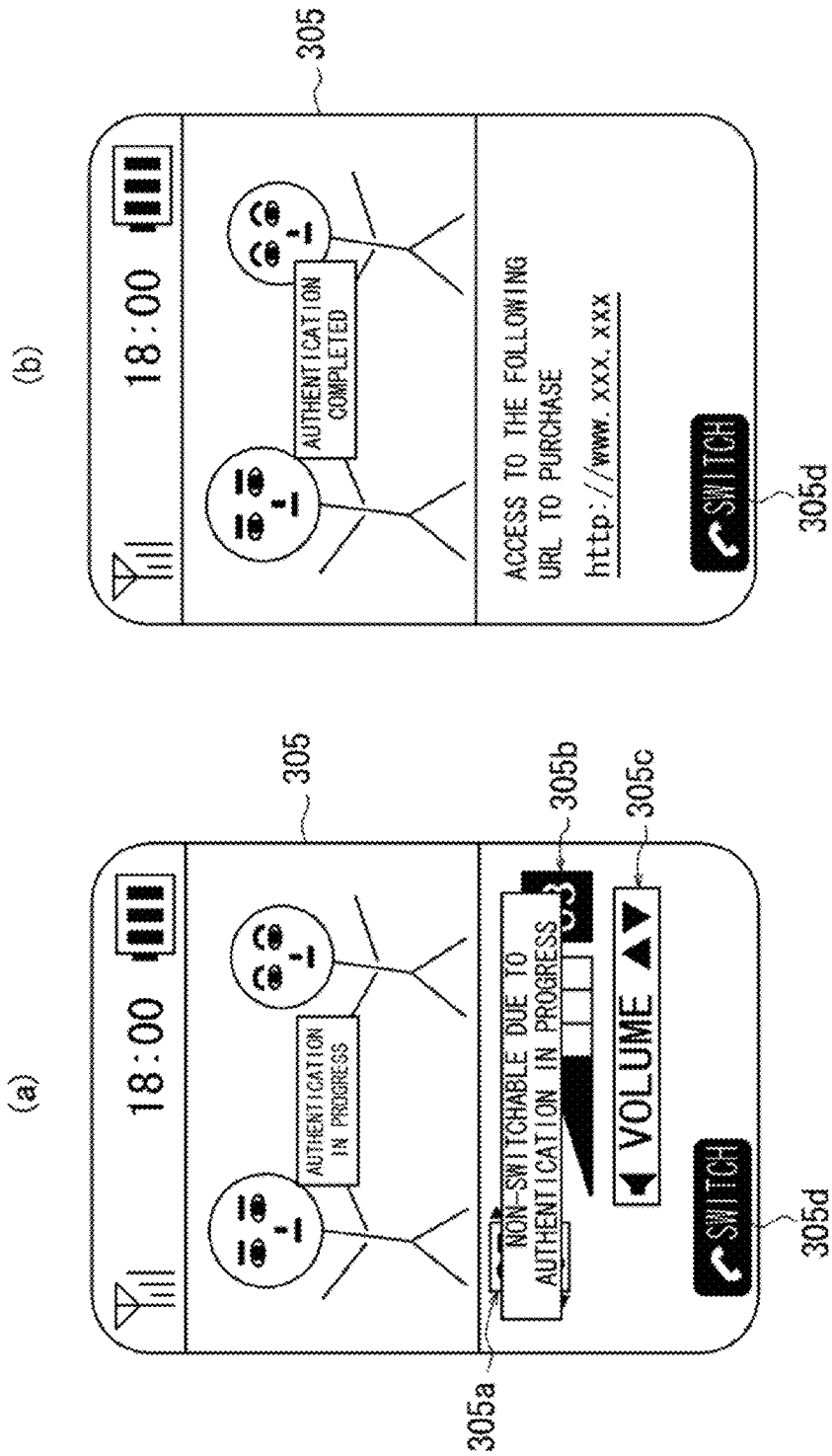
FIG. 9 is a diagram showing an example of a screen display of the reception apparatus in accordance with the third embodiment.

The following is a description of an operation of the main unit of the reception apparatus 300 in accordance with the present embodiment, with reference to a flow chart shown in FIG. 8 and an example of the screen display shown in FIG. 9.

First, in response to the operation of the input unit 307 by the user to switch the broadcast channel (CH), the control unit 310 switches the broadcast channel received by the broadcast reception unit 301 to the desired broadcast channel. Then, in a similar manner to the above embodiments, the authentication process unit 302 decrypts an image signal, an audio signal and a data signal of a stream received on the broadcast channel and starts authentication of the contents (step S31).

When there is an image signal and an audio signal that can be output as a result of the decryption at the step S31, the control unit 310 controls the contents reproduction unit 304 to reproduce the image signal, the audio signal and the data signal which are decrypted, and controls the image to be displayed on the display unit 305 and the audio is output from the speaker 306 (step S32). Thus, even during the authentication of the contents, the user can immediately view the contents of the desired broadcast channel selected by the broadcast reception unit 301 in a similar manner to the above embodiments, which will inflict no stress on the user. Since the reception apparatus 300 sets the BML non-display mode as a default display, the BML is not displayed at this point.

When there is a display switch request to the screen composition including the BML by an operation of the first switch key 307a of the input unit 307 during the authentication of the contents by the authentication process unit 302 (step S33), the control unit 310 invalidates and temporarily stores the display switch request in the memory 308, and then determines a state of the authentication of the contents by the authentication process unit 302 (step S34). When the authentication is still in progress as a result, the display unit 305 displays a message informing that the display cannot be switched due to the authentication in progress (step S35), for example, as shown in FIG. 9(a).

FIG. 9(a) shows a case where the display unit 305 has the vertically long display area. In this case, a message "Authentication In Progress" is displayed overlapping an image on the upper image display area during the authentication of the contents, while a broadcast channel number 305a, a volume indicator 305b, an operation key 305c assigned for adjustment of volume, and a BML display switch key 305d assigned as the first switch key 307a, as well as a message "Non-Switchable due to Authentication In Progress" overlapping a part of them, are displayed on the lower data display area. It is to be noted that an off-hook key (phone call key) is assigned as the first switch key 307a here.

Subsequently, when the authentication of the contents is succeeded (OK) by the authentication process unit 302 at the step S34, the control unit 310 reads out the display switch request stored in the memory 308, as shown in FIG. 9(b), sets a display screen on the data display area in the lower part of the display unit 305 as a BML display screen and switches the screen composition of the display unit 305 to the screen composition including the BML (step S36). In the image display area in the upper part of the display unit 305, the message "Authentication Completed" is displayed overlapping the image for a predetermined period from the point where the authentication is succeeded. Thereby, the user can access to the URL included in the BML displayed on the display unit 305 by using the input unit 307. When the first switch key 307a is operated later, the control unit 310 returns the screen composition of the display unit 305 to the screen composition not including the BML.

On the contrary, in a case where the authentication of the contents is failed (NG) by the authentication process unit 302 at the step S34, the control unit 310, in a similar manner to the first embodiment, erases the display switch request stored in the memory 308, controls such that the display unit 305 displays a message indicating that both of the image and the data cannot be displayed due to the authentication NG, and then ends displaying the image and the data and outputting the audio (step S37).

As described above, the reception apparatus 300 in accordance with the present embodiment always displays the image and outputs the audio even during the authentication of the contents, invalidates the display switch request to the screen composition including the BML by the first switch key 307a when the reception apparatus 300 is in the BML non-display mode, and then switches to the screen composition including the BML after the authentication is succeeded. Thus, in a similar manner to the first embodiment, the user can immediately view the contents of the desired broadcast channel selected, which inflicts no stress or the disadvantage on the user.

Fourth Embodiment

A reception apparatus in accordance with a fourth embodiment of the present invention is configured such that, in the reception apparatus 300 in accordance with the first embodiment, the control unit 310 controls the apparatus 300, during the authentication of the contents, to invalidate the operation itself of the first switch key 307a and display the BML display switch key 305d with the lower brightness than the normal brightness on the display unit 305 or not to display the BML display switch key 305d at all and then, after the authentication is succeeded, to validate the operation of the first switch key 307a and display the BML display switch key 305d with the normal brightness on the display unit 305.

Figure 10:
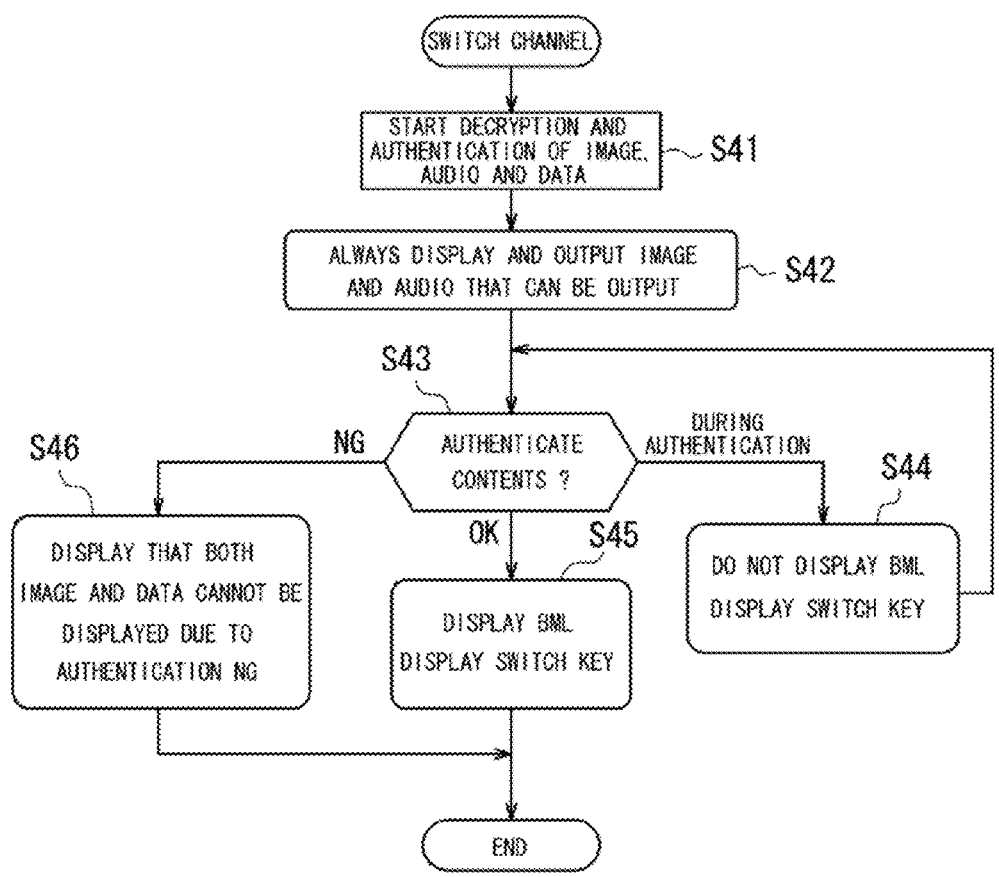
FIG. 10 is a flow chart illustrating an operation of a main section of a reception apparatus in accordance with a fourth embodiment of the present invention.
Figure 11:
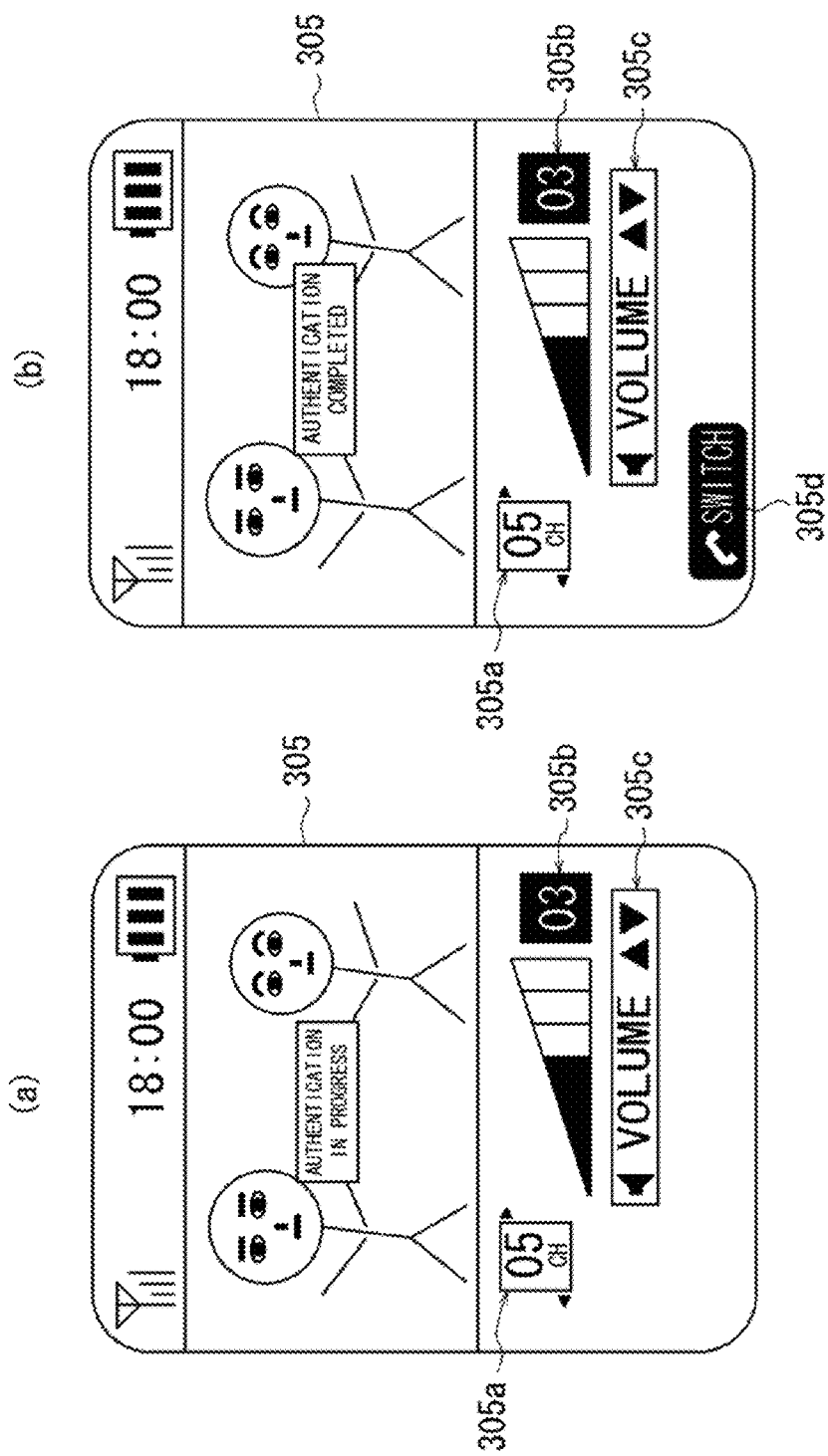
FIG. 11 is a diagram showing an example of a screen display of the reception apparatus in accordance with the fourth embodiment.

The following is a description of an operation of the main unit of the reception apparatus 300 in accordance with the present embodiment, with reference to a flow chart shown in FIG. 10 and an example of the screen display shown in FIG. 11.

First, in response to the operation of the input unit 307 by the user to switch the broadcast channel (CH), the control unit 310 switches the broadcast channel received by the broadcast reception unit 301 to the desired broadcast channel. Then, in a similar manner to the above embodiments, the authentication process unit 302 decrypts an image signal, an audio signal and a data signal of a stream received on the broadcast channel and starts authentication of the contents (step S41).

When there is an image signal and an audio signal that can be output as a result of the decryption at the step S41, the control unit 310 controls the contents reproduction unit 304 to reproduce the image signal, the audio signal and the data signal which are decrypted so as to display the image on the display unit 305 while outputting the audio from the speaker 306 (step S42). Thus, even during the authentication of the contents, the user can immediately view the contents of the desired broadcast channel selected by the broadcast reception unit 301 in a similar manner to the above embodiments, which will inflict no stress on the user.

The control unit 310 determines the state of the authentication of the contents by the authentication process unit 302 (step S43) and, when the authentication is in progress, the BML display switch key 305d is not displayed on the display unit 305 (step S44), as shown in FIG. 11(a). FIG. 11(a) shows a case where the message "Authentication In Progress" is displayed overlapping the image on the upper image display area while the broadcast channel number 305a, the volume indicator 305b, and the operation key 305c assigned for adjustment of volume are displayed on the lower data display area, during the authentication of the contents.

Subsequently, in a case where the authentication of the contents is succeeded (OK) by the authentication process unit 302 at the step S43, the control unit 310 controls such that the display unit 305 displays the BML display switch key 305d (step S45) as shown in FIG. 11(b) and validates an operation of the corresponding first switch key 307a.

On the contrary, in a case where the authentication of the contents is failed (NG), the control unit 310 controls such that the display unit 305 displays a message indicating that both of the image and the data cannot be displayed due to the authentication NG in a similar manner to the above embodiments, and then ends displaying the image and the data and outputting the audio (step S46).

As described above, the reception apparatus 300 in accordance with the present embodiment always displays the image and outputs the audio even during the authentication of the contents. Thus, the user can immediately view the contents of the desired broadcast channel selected, which inflicts no stress on the user. Moreover, since the screen composition of the display unit 305 is set to the BML non-display mode and the operation itself of the first switch key 307a is invalidated without displaying the BML display switch key 305d during the authentication of the contents, it can avoid inflicting the disadvantage on the user during the authentication, Fifth Embodiment A reception apparatus in accordance with a fifth embodiment of the present invention is configured such that, in the reception apparatus 300 in accordance with the first embodiment, the screen composition of the display unit 305 is switched in series as shown in FIG. 12 every time the second switch key 307b of the input unit 307 is operated in a state where the authentication of the contents is succeeded, while the screen composition is switched in series skipping the screen composition including the BML, as shown in FIG. 13, during the authentication.

Figure 12:
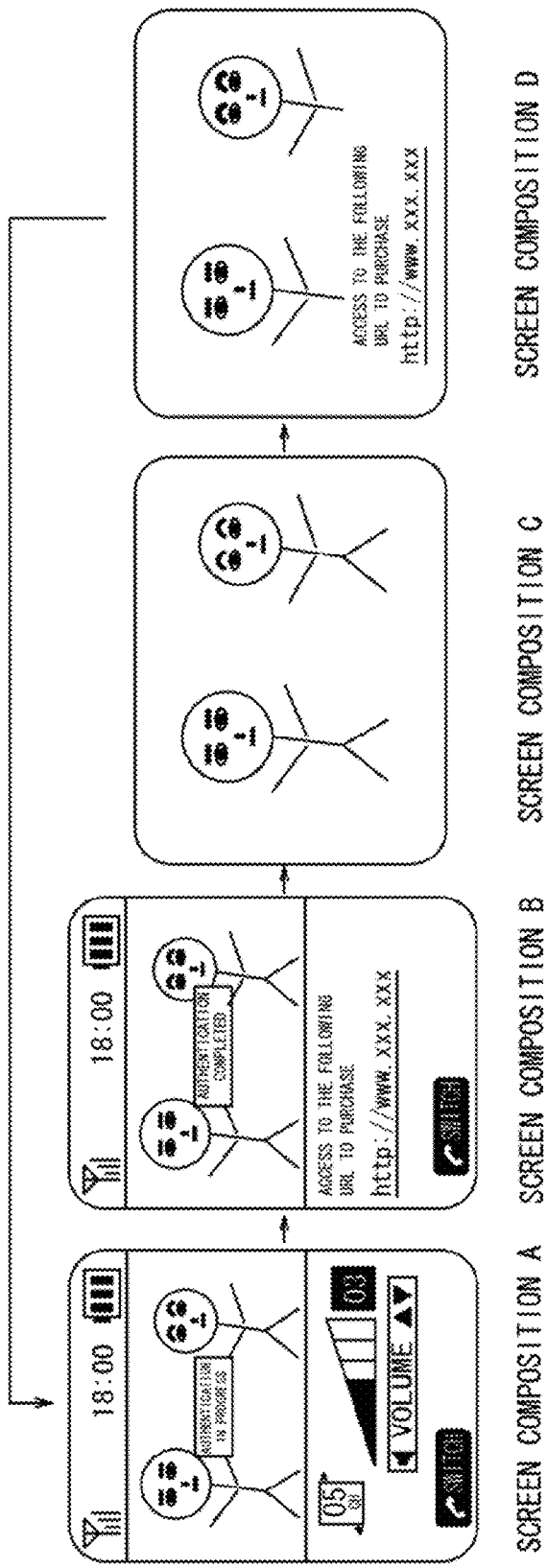
FIG. 12 is a diagram showing an example of display switching of screen compositions of the reception apparatus in a state where authentication is succeeded in accordance with the fourth embodiment of the present invention.

More specifically, the reception apparatus 300 in accordance with the present embodiment has screen compositions of the display unit 305 in combination with a large image display area or a small image display area with or without a data signal such as, as shown in FIG. 12, a screen composition A with a vertically long display area to display an image on the upper part thereof and an operation screen on the lower part thereof, a screen composition B with the vertically long display area to display the image on the upper part and the BML screen on the lower part, a screen composition C with a horizontally long display area to display the image on the whole area, and a screen composition D with the horizontally long display area to display the image on the whole area and the BML overlapping the image.

Figure 13:
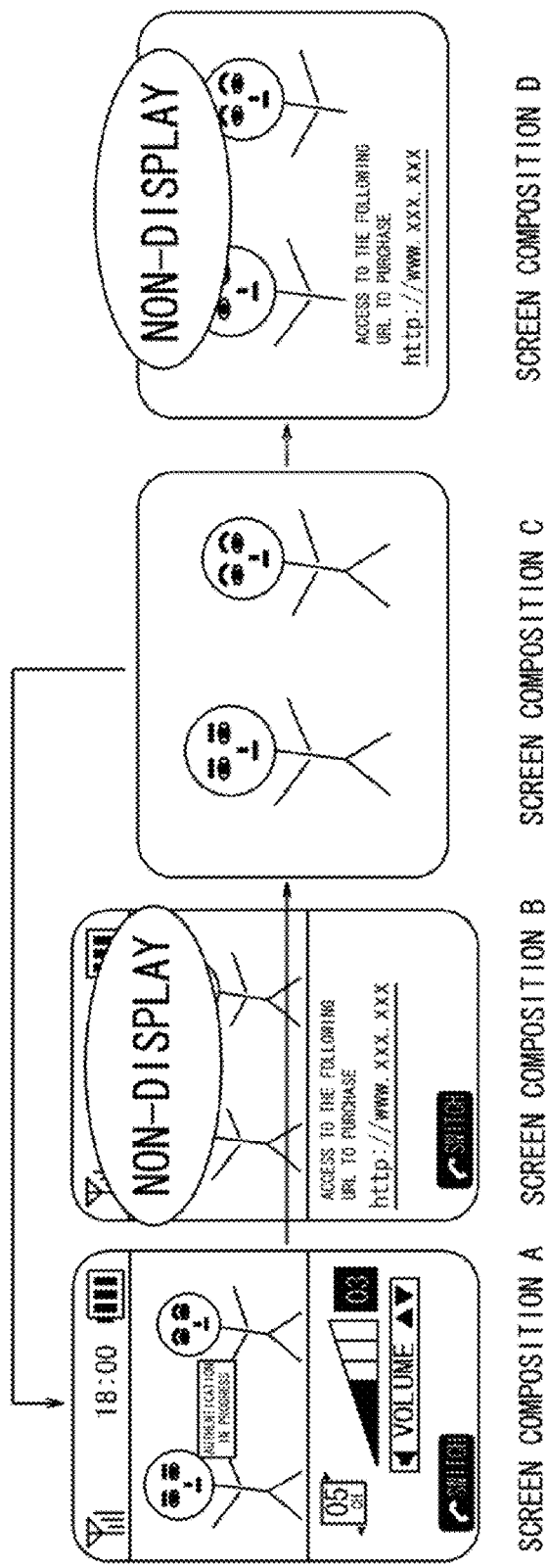
FIG. 13 is a diagram showing an example of display switching of screen compositions of the reception apparatus during the authentication in accordance with the fourth embodiment.

Although the control unit 310 switches the screen composition so as to cycle from the screen compositions A to the screen composition D in series as shown in FIG. 12 every time the second switch key 307b of the input unit 307 is operated in a state where the authentication of the contents is succeeded by the authentication process unit 302, the control unit 310 switches the screen composition between the screen compositions A and C skipping the screen compositions B and D that include the BML during the authentication, as shown in FIG. 13.

Figure 14:
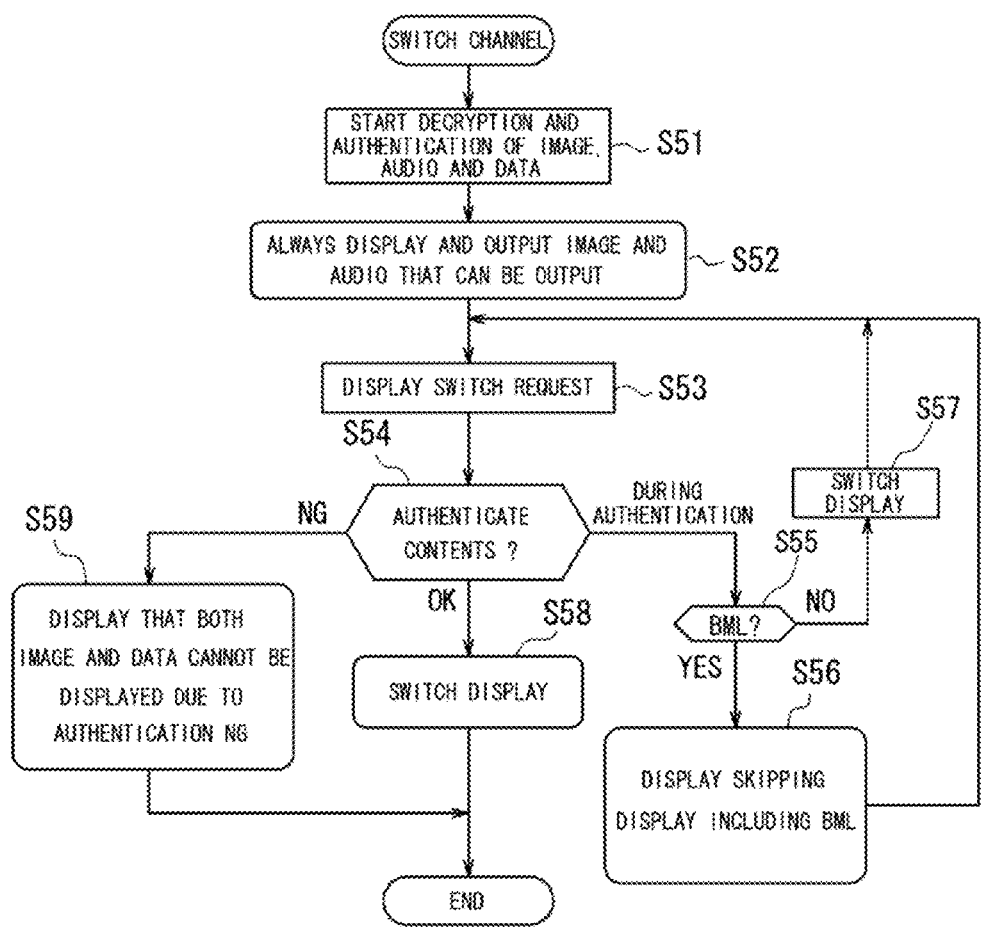
FIG. 14 is a flow chart illustrating an operation of a main section of a reception apparatus in accordance with a fifth embodiment of the present invention.

The following is a description of an operation of the main unit of the reception apparatus 300 in accordance with the present embodiment, with reference to a flow chart shown in FIG. 14.

First, in response to the operation of the input unit 307 by the user to switch the broadcast channel (CH), the control unit 310 switches the broadcast channel received by the broadcast reception unit 301 to the desired broadcast channel. Then, in a similar manner to the above embodiments, the authentication process unit 302 decrypts an image signal, an audio signal and a data signal of a stream received on the broadcast channel and starts authentication of contents (step S51).

In a case where there is an image signal and an audio signal that can be output as a result of the decryption at the step S51, the control unit 310 controls such that the contents reproduction unit 304 reproduces the image signal, the audio signal and the data signal which are decrypted, so as to display the image on the display unit 305 while outputting the audio from the speaker 306 (step S52). Thus, even during the authentication of the contents, the user can immediately view the contents of the desired broadcast channel selected by the broadcast reception unit 301 in a similar manner to the above embodiments, which will inflict no stress on the user.

When there is the display switch request of the screen composition by the operation of the second switch key 307b of the input unit 307 during the authentication of the contents by the authentication process unit 302 (step S53), the control unit 310 determines a state of the authentication of the contents by the authentication process unit 302 (step S54).

In a case where the authentication is still in progress as a result, the control unit 310 determines whether the BML is included in a next screen composition switched to by the operation of the second switch key 307b (step S55). When the BML is included in the next screen composition, the control unit 310 skips the next screen composition and switches the display to the display composition not including the BML (step S56), and then shifts to the step S53. On the contrary, when the BML is not included in the next screen composition switched to by the operation of the second switch key 307b at the step S55, the control unit 310 switches the display to the next screen composition (step S57), and then shifts to the step S53.

In a case where the authentication of the contents is succeeded (OK) by the authentication process unit 302 at the step S54, the control unit 310 changes the display to the next screen composition, regardless of whether the BML is included in the next screen composition (step S58).

On the contrary, in a case where the authentication of the contents is failed (NG) by the authentication process unit 302 at the step S54, the control unit 310 controls such that the display unit 305 displays a message indicating that both of the image and the data cannot be displayed due to the authentication NG in a similar manner to the above embodiments, and then ends displaying the image and the data and outputting the audio (step S59).

As described above, the reception apparatus 300 in accordance with the present embodiment always displays the image and outputs the audio even during the authentication of the contents. Thus, the user can immediately view the contents of the desired broadcast channel selected, which inflicts no stress on the user. Moreover, since switching the display of the screen composition by the operation of the second switch key 307b of the input unit 307 is limited and the screen composition including the BML is skipped not to be displayed during the authentication of the contents, it can avoid inflicting the disadvantage on the user during the authentication.

It should be noted that the present invention is not limited to the above embodiments and many various modifications and changes can be implemented. For example, although each of the above embodiments describes based on a reception when the broadcast channel is switched, the present invention is also applicable to a case where authentication for receiving a desired broadcast channel is performed once more due to a failure in the authentication of the contents after the authentication is once succeeded. Moreover, displaying the BML display switch key 305d on the display unit 305 can be omitted in the third to fifth embodiments.

The invention claimed is:

1. A reception apparatus comprising:
a receiver configured to receive a stream including contents and a data signal;

a display processor configured to control display based on the stream received by the receiver;

an authentication processor configured to authenticate a sender of the stream received by the receiver;

a signal separator configured to separate the data signal from the stream received by the receiver; and a controller configured to control the display processor to display a first process displaying a screen based on the contents and a second process displaying a screen based on the data signal separated by the signal separator, wherein the controller controls the display processor, during authentication of the stream by the authentication processor, to prohibit the second process while performing the first process.

2. The reception apparatus according to claim 1, further comprising a first switch key configured to switch a screen composition of the display processor to a screen composition including the screen based on the data signal, wherein the controller invalidates switching of the screen composition of the display processor by the first switch key during the authentication of the stream by the authentication processor.

3. The reception apparatus according to claim 1, further comprising a second switch key configured to switch a screen composition of the display processor, wherein the controller skips a screen composition including the screen based on the data signal when the screen composition of the display processor is switched by the second switch key during the authentication of the stream by the authentication processor.

4. The reception apparatus of claim 1 wherein the data signal comprises a URL link.

5. The reception apparatus of claim 1 wherein the data signal comprises a broadcast markup language (BML) information.

6. A reception apparatus comprising:

a receiver configured to receive a stream including contents and a data signal;

a display processor configured to control display based on the stream received by the receiver;

an authentication processor configured to authenticate a sender of the stream received by the receiver;

a signal separator configured to separate the data signal from the stream received by the receiver; and a controller configured to control the display processor, during authentication of the stream by the authentication processor, to restrict a link to an external site based on the data signal separated by the signal separator while displaying a screen based on the contents.

7. The reception apparatus according to claim 6, wherein the controller prohibits the display processor from displaying the link to the external site based on the data signal during the authentication of the stream by the authentication processor.

8. The reception apparatus according to claim 6, wherein the controller invalidates an access request to the link to the external site based on the data signal displayed on the display processor during the authentication of the stream by the authentication processor.

9. The reception apparatus according to claim 6, further comprising memory configured to store an access request to the link to the external site based on the data signal displayed on the display processor, wherein the controller stores the access request to the link to the external site based on the data signal displayed on the display processor during the authentication of the stream by the authentication processor and, when the authentication of the stream by the authentication processor is succeeded, executes the access request stored in the memory.

* * * * *